(12) United States Patent
Duvvuru et al.

(10) Patent No.: US 7,324,539 B1
(45) Date of Patent: Jan. 29, 2008

(54) METHOD AND APPARATUS FOR PROCESSING CHANNELIZED AND UNCHANNELIZED DATA WITHIN A SIGNAL

(75) Inventors: Ramesh Duvvuru, San Jose, CA (US); Felix Chow, Sunnyvale, CA (US); Ricky See, Milpitas, CA (US); Sharath Narahari, Pleasanton, CA (US); David Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 944 days.

(21) Appl. No.: 10/109,521

(22) Filed: Mar. 28, 2002

Related U.S. Application Data

(60) Provisional application No. 60/333,845, filed on Nov. 28, 2001.

(51) Int. Cl.
*H04L 12/56* (2006.01)
(52) U.S. Cl. .................. 370/419; 370/463; 709/250
(58) Field of Classification Search ............... 370/535, 370/389, 537, 466, 467, 404, 395.52, 395.1, 370/476, 498, 401, 351, 463, 395.21, 230.1, 370/395.63, 419; 710/33; 379/88.17; 709/246, 709/250
See application file for complete search history.

(56) References Cited

U.S. PATENT DOCUMENTS

| | | | |
|---|---|---|---|
| 5,268,936 A | 12/1993 | Bernardy | 375/372 |
| 5,400,369 A | 3/1995 | Ikemura | 375/368 |
| 5,490,252 A * | 2/1996 | Macera et al. | 709/249 |
| 5,511,077 A | 4/1996 | Shimada | 370/505 |
| 5,519,700 A | 5/1996 | Punj | 370/419 |
| 5,533,018 A | 7/1996 | DeJager et al. | 370/395.5 |
| 5,550,820 A | 8/1996 | Baran | 370/395.5 |
| 5,621,773 A | 4/1997 | Varma et al. | 375/368 |
| 5,805,571 A | 9/1998 | Zwan et al. | 370/249 |
| 5,825,770 A | 10/1998 | Coady et al. | 370/378 |
| 5,963,564 A | 10/1999 | Petersen et al. | 370/503 |
| 6,038,226 A | 3/2000 | Ellersick et al. | 370/352 |
| 6,075,788 A | 6/2000 | Vogel | 370/395.51 |
| 6,185,635 B1 | 2/2001 | O'Loughlin et al. | 710/31 |
| 6,198,751 B1 | 3/2001 | Dorsey et al. | 370/466 |
| 6,237,029 B1 | 5/2001 | Master et al. | 709/217 |
| 6,272,144 B1 | 8/2001 | Berenbaum et al. | 370/419 |
| 6,272,151 B1 * | 8/2001 | Gupta et al. | 370/489 |
| 6,285,673 B1 | 9/2001 | Blackburn et al. | 370/360 |
| 6,320,877 B1 | 11/2001 | Humphrey et al. | 370/474 |

(Continued)

OTHER PUBLICATIONS

Kusky, R.G., et al., "Analysis of Techniques for the Reduction of Jitter Caused by SONET Pointer Adjustments," IEEE Transactions on Communications, vol. 42, No. 2/3/4, pp. 2036-2050, Feb./Mar./Apr. 1994.

*Primary Examiner*—John Pezzlo
(74) *Attorney, Agent, or Firm*—Blakely, Sokoloff, Taylor & Zafman LLP

(57) ABSTRACT

A method and apparatus for processing channelized and unchannelized data within a signal are described. In one embodiment, a method comprises receiving in a network element, data packets within a number of channels, wherein each of the number of channels are channelized or unchannelized, processing, in a protocol engine within the network element, the data packets within the number of channels that are channelized, and processing, in the protocol engine within the network element, the data packets within the number of channels that are unchannelized.

41 Claims, 13 Drawing Sheets

U.S. PATENT DOCUMENTS

| | | |
|---|---|---|
| 6,385,209 B1 | 5/2002 | Skirmont et al. ............ 370/419 |
| 6,466,591 B1 * | 10/2002 | See et al. .................... 370/535 |
| 6,765,916 B1 * | 7/2004 | Duvvuru et al. ......... 370/395.5 |
| 6,778,561 B1 * | 8/2004 | Jha ............................ 370/537 |
| 6,990,121 B1 * | 1/2006 | Stiles et al. ................. 370/498 |
| 2001/0033580 A1 | 10/2001 | Dorsey et al. .............. 370/466 |
| 2002/0018468 A1 | 2/2002 | Nishihara ................... 370/389 |
| 2004/0252688 A1 * | 12/2004 | May et al. ................... 370/389 |
| 2005/0180429 A1 * | 8/2005 | Ghahremani et al. .. 370/395.21 |

* cited by examiner

| STS1-9 | STS10-11 | STS12-21 | STS22-23 | STS24-35 | STS36-37 | STS38-44 | STS45-46 | STS47-48 |
|---|---|---|---|---|---|---|---|---|
| 1302 | 1204 | 1306 | 1308 | 1310 | 1312 | 1312 | 1312 | 1318 |

FIG. 13

METHOD AND APPARATUS FOR PROCESSING CHANNELIZED AND UNCHANNELIZED DATA WITHIN A SIGNAL

RELATED APPLICATIONS

This application claims the benefit of U.S. provisional patent application No. 60/333,845 entitled "Method and Apparatus for Processing Channelized and Unchannelized Data Within a Signal" filed on Nov. 28, 2001.

FIELD OF THE INVENTION

The invention relates to the field of communications. More specifically, the invention relates to processing channelized and unchannelized data within a signal.

BACKGROUND OF THE INVENTION

Within the field of communications, the need for high-speed transmission of data has continued to increase, as customers continue to need more bandwidth to satisfy the growing needs. Moreover, in addition to the demand for higher bandwidth, there has also been an increased need for various types of services that employ different protocols. For example, certain customers (e.g., companies providing voice services) of high-speed networks want to operate on a Time Division Multiplexing (TDM) Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP), Multi-Protocol Label Switching (MPLS) or Ethernet.

Network elements are used to route or switch data of these different protocols across such high-speed networks. Examples of the types of data signals that can be transmitted and received by these network elements include Digital Signal (DS)-1 and DS-3 signals, which include a number of channels. Examples of other types of data signals that can be transmitted and received by these network elements include signals based on the Synchronous Optical Network (SONET) standard or Synchronous Digital Hierarchy (SDH) standard. Moreover, these network elements typically include a number of line cards that include a number of ports to receive and transmit these data. In order to accommodate the different protocol types, conventional network elements are designed and provisioned such that a given port on a given line card processes data of a particular protocol. In other words, a particular port is tied to a particular type of protocol. Disadvantageously, this limitation precludes the handling of data of different types of protocols for a given port of a network element.

Channels are communication pathways through which data are transmitted between network elements. For example, DS-1 and DS-3 signals comprise numerous channels for transmitting data between network elements. Sometimes when attempting to process data from a specific channel, a network element idly waits until either data arrives or a channel timeout occurs. Along with processing data, network elements also perform system maintenance to keep the network element running smoothly. For example, a given channel may be re-provisioned to process data of a different format. Accordingly, the channel is reset and re-provisioned based on the new format. To help illustrate, before a channel transmitting ATM data packets can transmit Internet Protocol (IP) data packets, the channel is reset and re-provisioned to process IP data packets. After resetting the channel, the IP data can be sent over the channel.

SUMMARY OF THE INVENTION

These and other aspects of the present invention will be better described with reference to the Detailed Description and the accompanying Figures. A method and apparatus for processing channelized and unchannelized data within a signal is described. In one embodiment, the method includes receiving in a network element, data packets within a number of channels, wherein each of the number of channels are channelized or unchannelized. The method also includes processing, in a protocol engine within the network element, the data packets within the number of channels that are channelized; and processing, in the protocol engine within the network element, the data packets within the number of channels that are unchannelized.

In another embodiment, the method comprises receiving in a network element data packets within a number of channels, wherein each of the number of channels are channelized or unchannelized, and wherein the data packets are stored in a buffer within the network element; and sending the data packets to a protocol engine for processing. The processing comprises determining a channel of the number of channels to process, determining whether the channel is channelized or unchannelized, determining a protocol of a number of protocols for the channel, upon determining the channel is unchannelized, and determining protocol settings for the channel, upon determining the channel is unchannelized. The processing further comprises determining a protocol of the number of protocols for the channel, upon determining the channel is channelized, determining protocol settings for the channel, upon determining the channel is channelized, determining where in the buffer data packet processing is to begin, and processing the data packets, and forwarding the data packets.

In another embodiment, the method includes retrieving in a network element, data packets from a data buffer, processing, in a protocol engine within the network element, the data packets, placing the data packets within a channelized channel of a number of channels, and placing the data packets within an unchannelized channel of the number of channels.

In another embodiment, the method includes retrieving a data packet from a memory buffer, preparing, within a protocol engine, the data packet for insertion into a first channel of a first number of channels, wherein the first channel comprises one of a number of protocols, wherein each protocol comprises a number of enabled protocol options. The preparing comprises determining one of the first number of channels into which the data packet is to be inserted, determining whether the first channel is channelized or unchannelized, wherein a channelized first channel includes a second number of channels. The preparing further includes determining a second channel within the second number of channels into which the data packet is to be placed, upon determining that the first channel is channelized, determining one of the number of protocols of the channel, determining at least one of the number of enabled protocol options, and processing the data packet according to the at least one enabled protocol options. The preparing further includes placing the data packet into the first channel, upon determining the first channel is unchannelized and placing the data packet into the channel within the second channel, upon determining the first channel is channelized.

In another embodiment, the apparatus includes a buffer, the buffer for storing data, wherein the data is channelized and unchannelized, and wherein the data is based on a number of protocols, and a protocol engine coupled to the buffer, the protocol engine to process the data.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings:

FIG. 13 is a block diagram of a SONET signal carrying data, according to embodiments of the present invention.

DETAILED DESCRIPTION

A method and apparatus for processing channelized and unchannelized data within a signal. In the following description, for purposes of explanation, numerous specific details are set forth in order to provide a thorough understanding of the present invention. It will be evident, however, to one skilled in the art that the present invention may be practiced without these specific details.

System Description

Figure 1:
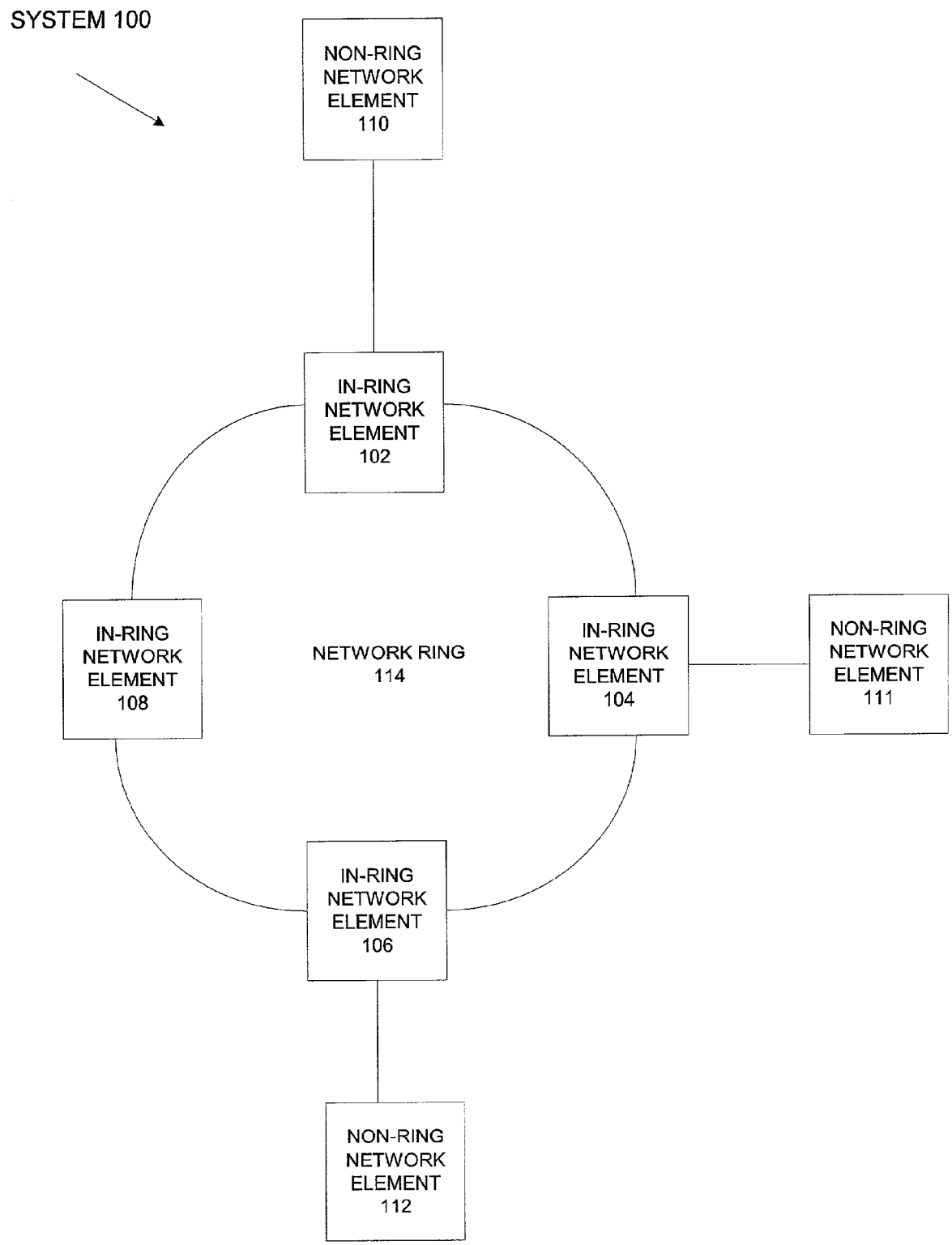
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110-112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
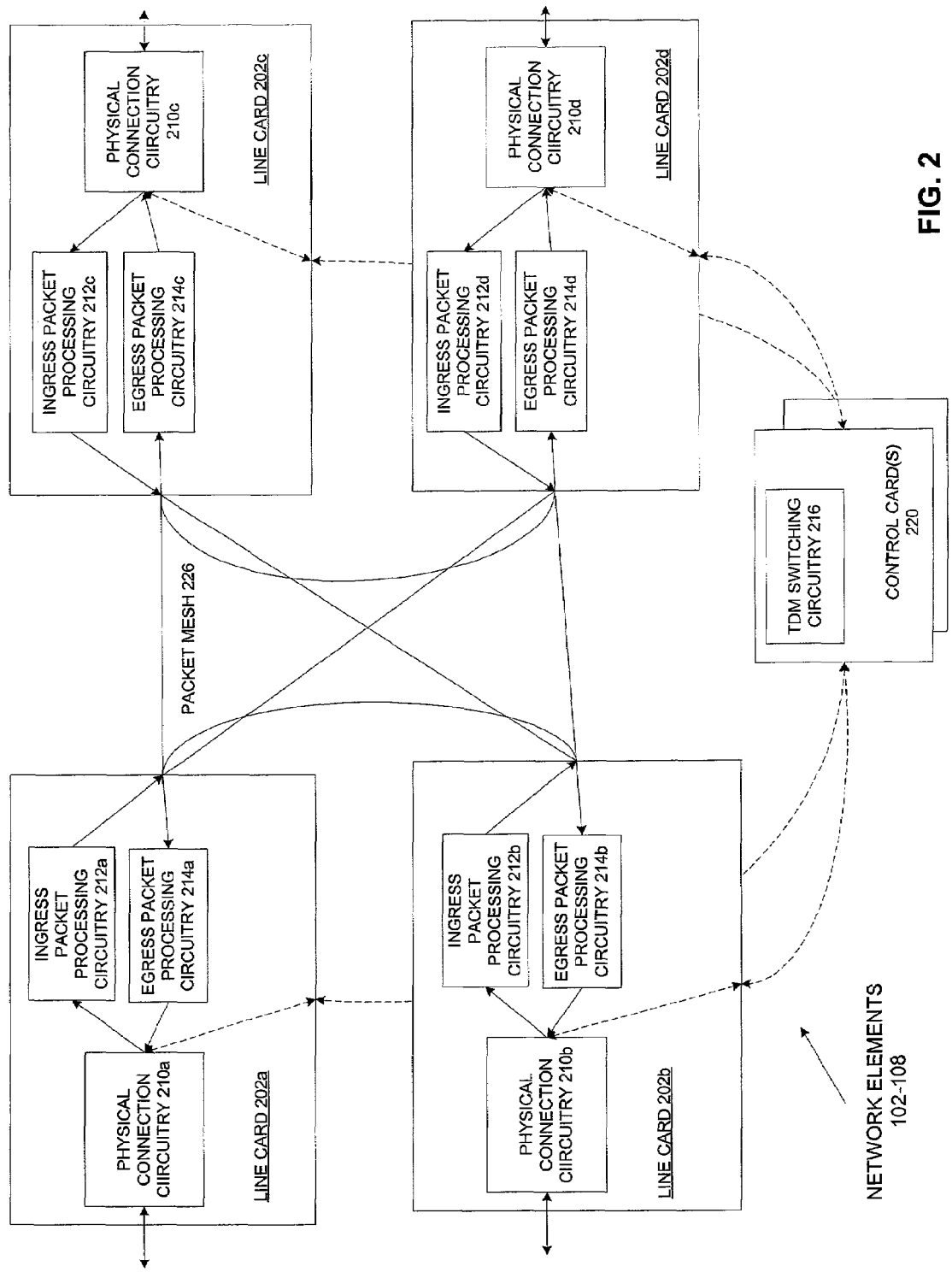
FIG. 2 illustrates portions of in-ring network elements 102-108, according to embodiments of the present invention.

FIG. 2 illustrates portions of in-ring network elements 102-108 (for purposes of FIG. 2, hereinafter "network element 102"), according to embodiments of the present invention. As shown, network element 102 includes line cards 202A-D and control card(s) 220, such that control card(s) 220 are coupled to each of line cards 202A-D. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202A-D are coupled to one another. For example, line card 202a is coupled to line cards 202b-d through packet mesh 226. However, embodiments of the present invention are not limited to a full mesh for the transmission of packets among line cards 202A-D, as any type of switching method that switches based on the addressing scheme described herein can be incorporated into embodiments of the present invention. For example, in one embodiment, line cards 202A-D could be coupled together using a switch fabric, such that the line cards are coupled to a control card, which provides for the switching therein.

Line cards 202A-D include physical connection circuitry 210A-D, ingress packet processing circuitry 212A-D and egress packet processing 214A-D, respectively. Physical connection circuitry 210A-D can be coupled to lines external to network element 102, as shown, which can carry optical and/or electrical signals, which is described in more detail below in conjunction with FIG. 7. In one embodiment, line cards 202A-D of network element 102 may be connected to an optical line transmitting SONET STS-N signals. Moreover, in an embodiment, line cards 202A-D of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202A-D can be coupled to four optical and/or electrical lines. In another embodiment, each line card 202A-D can be coupled to eight optical and/or electrical lines. However, embodiments of the present invention are not so limited, as a lesser or greater number of optical and/or electrical lines can be coupled to network element 102 through line cards 202A-D. Additionally, physical connection circuitry 210A-D are coupled to ingress packet processing circuitry 212A-D, respectively, such that packet data being received from the optical and/or electrical lines is passed from physical connection circuitry 210A-D to ingress packet processing circuitry 212A-D, respectively. In one embodiment, the packet data is extracted from a TDM signal, which is described in more detail below.

Ingress packet processing circuitry 212A-D is coupled to packet mesh 226. Accordingly, each ingress packet processing circuitry 212A-D is coupled to each egress packet processing circuitry 214A-D, respectively, on other line cards 202A-D through packet mesh 226. Moreover, egress packet processing circuitry 214A-D is respectively coupled to physical connection circuitry 210A-D, such that packet data traffic coming in from packet mesh 226 from ingress packet processing circuitry 212A-D is transmitted from egress packet processing circuitry 214A-D to physical connection circuitry 210A-D, respectively.

Line cards incorporated into embodiments of the present invention are not limited to those illustrated by line cards 202A-D. Moreover, the network elements can have different line card configurations from that shown by line cards 202A-D. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc.

With regard to the TDM traffic, a second switch fabric (in addition to packet mesh 226) is formed among line cards 202A-D and TDM switching circuitry 216 of control cards 220, as illustrated by the dashed lines in FIG. 2. In particular, physical connection circuitry 210A-D is coupled to TDM switching circuitry 216 for the receiving and transmitting of TDM traffic into and out of network element 102. Accordingly, TDM switching circuitry 216 receive TDM traffic from physical connection circuitry 210A-D and switches this traffic to any of physical connection circuitry 210A-D, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first five timeslots of a TDM signal being transmitted out from a first interface of physical connection circuitry 210d.

Operation of Physical Connection Circuitry 210

Figure 3:
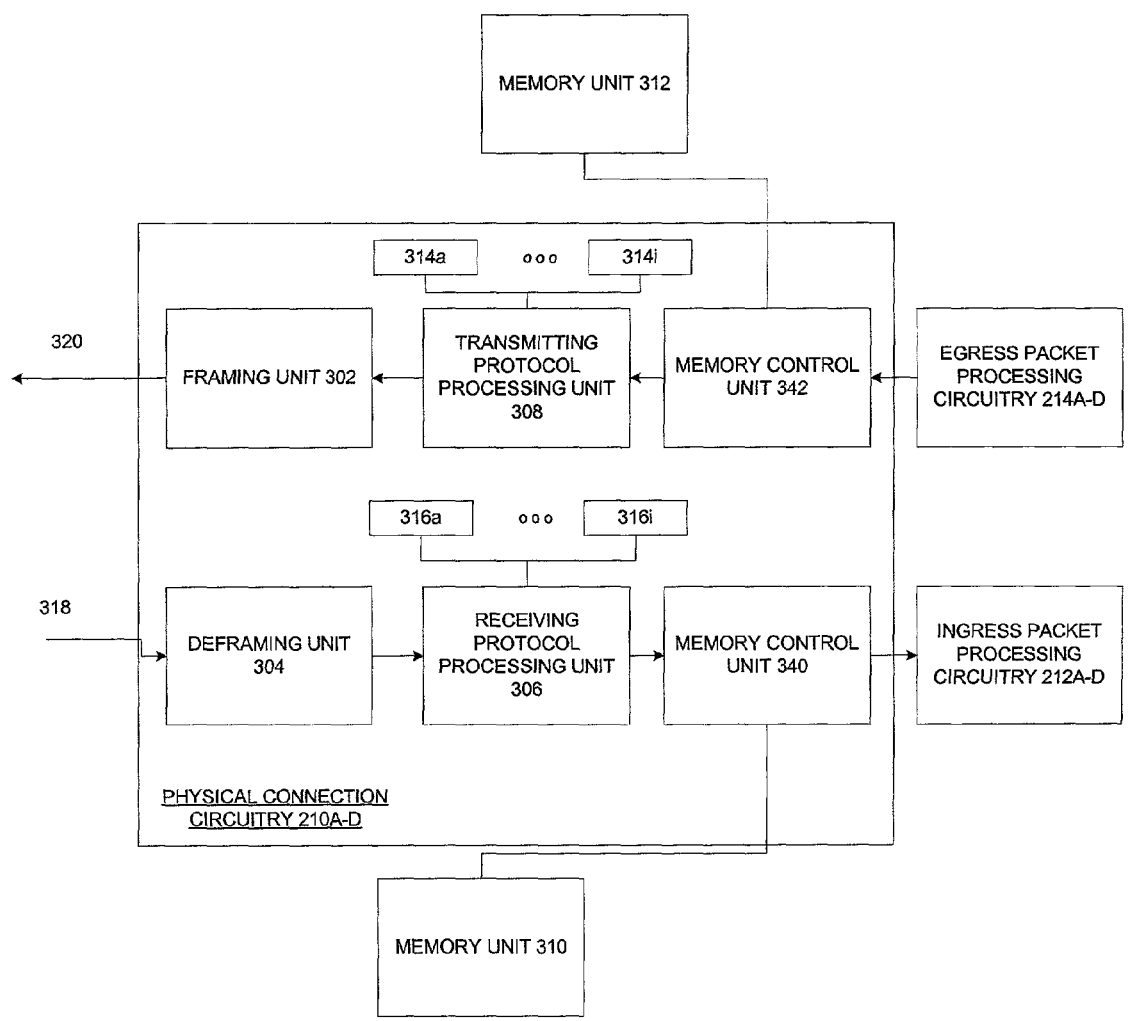
FIG. 3 is a block diagram of physical connection circuitry 210A-D, according to embodiments of the present invention.

FIG. 3 is a more detailed block diagram of physical connection circuitry 210A-D, according to embodiments of the present invention. In particular, physical connection circuitry 210A-D (hereinafter physical connection circuitry 210) includes framing unit 302, deframing unit 304, receiving protocol processing unit 306, transmitting protocol processing unit 308, register arrays 314a-i, register arrays 316a-i, memory control circuit 318 and memory control circuit 320. Additionally, memory control circuit 342 is coupled to memory unit 312, while memory control circuit 340 is coupled to memory unit 310. Memory control circuit 342 is also coupled to egress packet processing circuitry 214A-D (hereinafter egress packet processing circuitry 214), and memory control circuit 340 is coupled to ingress packet processing circuitry 212A-D (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a-i and register arrays 316a-i are also any type of read/write memory. In one embodiment, register arrays 314a-i and register arrays 316a-i are registers.

Deframing unit 304 is coupled to receive signal 318. Additionally, deframing unit 304 is coupled to receiving protocol processing unit 306, which is coupled to memory control unit 340 and register arrays 316a-i. Framing unit 302 is coupled to transmitting protocol processing unit 308, which is coupled to memory control unit 342 and register arrays 314a-i. Moreover, framing unit 302 transmits signal 320 out from physical connection circuitry 210.

Figure 4:
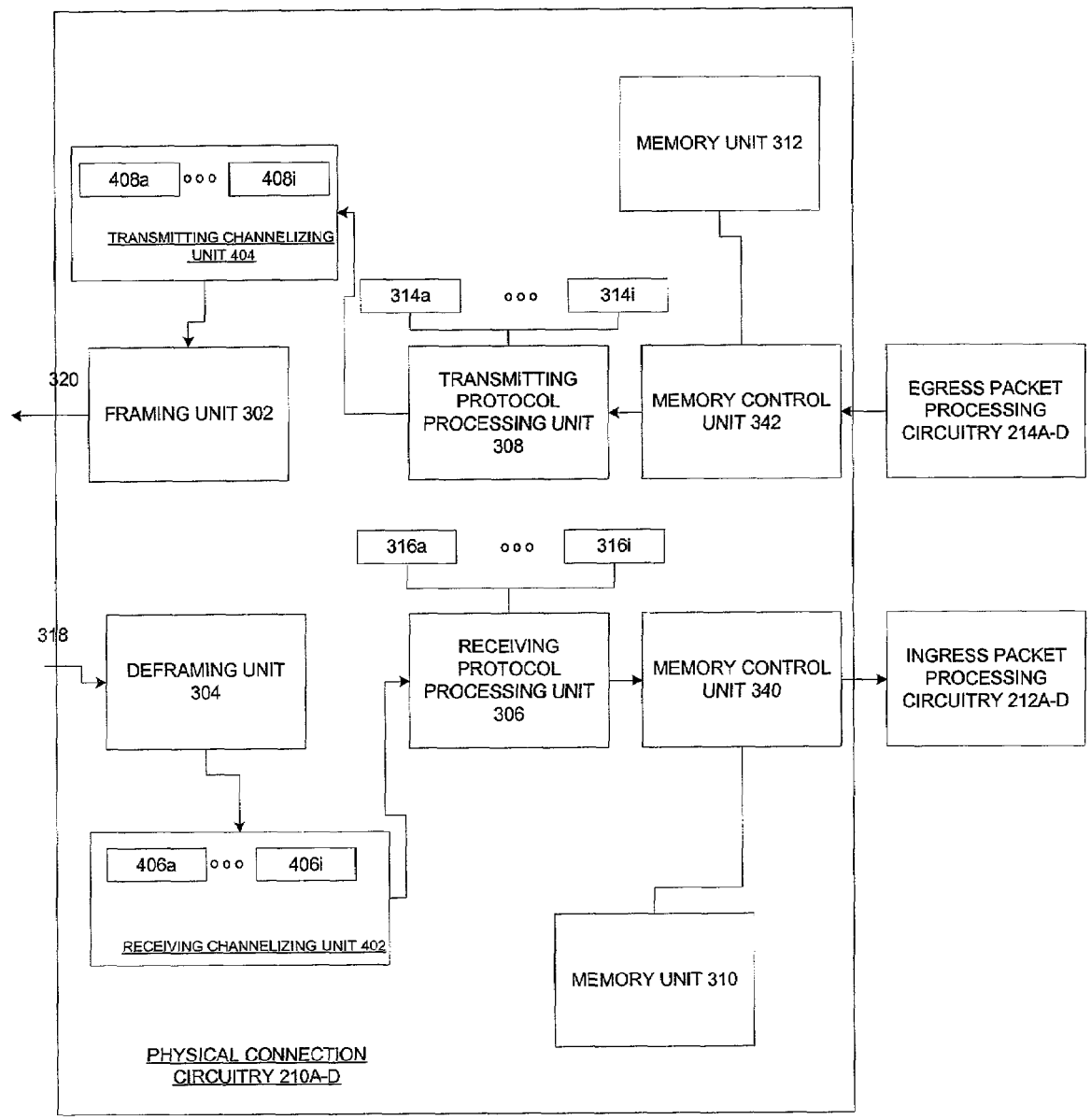
FIG. 4 is a more detailed block diagram of another embodiment of physical connection circuitry 210A-D, according to embodiments of the present invention.

FIG. 4 is a more detailed block diagram of another embodiment of physical connection circuitry 210A-D, according to embodiments of the present invention. Similar to the embodiment illustrated in FIG. 3, the embodiment of physical connection circuitry 210 illustrated in FIG. 4 includes framing unit 302, deframing unit 304, receiving protocol processing unit 306, transmitting protocol processing unit 308, register arrays 314a-i, register arrays 316a-i, memory control circuit 318 and memory control circuit 320. Additionally, physical connection circuitry 210 includes receiving channelizing unit 402 and transmitting channelizing unit 404. Receiving channelizing unit 402 includes buffers 406a-i, and transmitting channelizing unit 404 includes buffers 408a-i. Moreover, in contrast to the embodiment of FIG. 3, memory units 310-312 are internal to physical connection circuitry 210.

Memory control circuit 342 is coupled to memory unit 312, while memory control circuit 340 is coupled to memory unit 310. Memory control circuit 342 is also coupled to egress packet processing circuitry 214A-D (hereinafter egress packet processing circuitry 214), and memory control circuit 340 is coupled to ingress packet processing circuitry 212A-D (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a-i and register arrays 316a-i are also any type of read/write memory. In one embodiment, register arrays 314a-i and register arrays 316a-i are registers.

Deframing unit 304 is coupled to receive signal 318. Additionally, deframing unit 304 is coupled to receiving channelizing unit 402. Receiving channelizing unit 402 is coupled to receiving protocol processing unit 306, which is coupled to memory control unit 340 and register arrays 316a-i. Framing unit 302 is coupled to transmitting channelizing unit 404. Transmitting channelizing unit 404 is coupled to transmitting protocol processing unit 308, which is coupled to memory control unit 342 and register arrays 314a-i. Moreover, framing unit 302 transmits signal 320 out from physical connection circuitry 210. The operation of physical connection circuitry 210 will now be described in conjunction with FIGS. 5-12 below.

Processing of Data Packets Received

Figure 5:
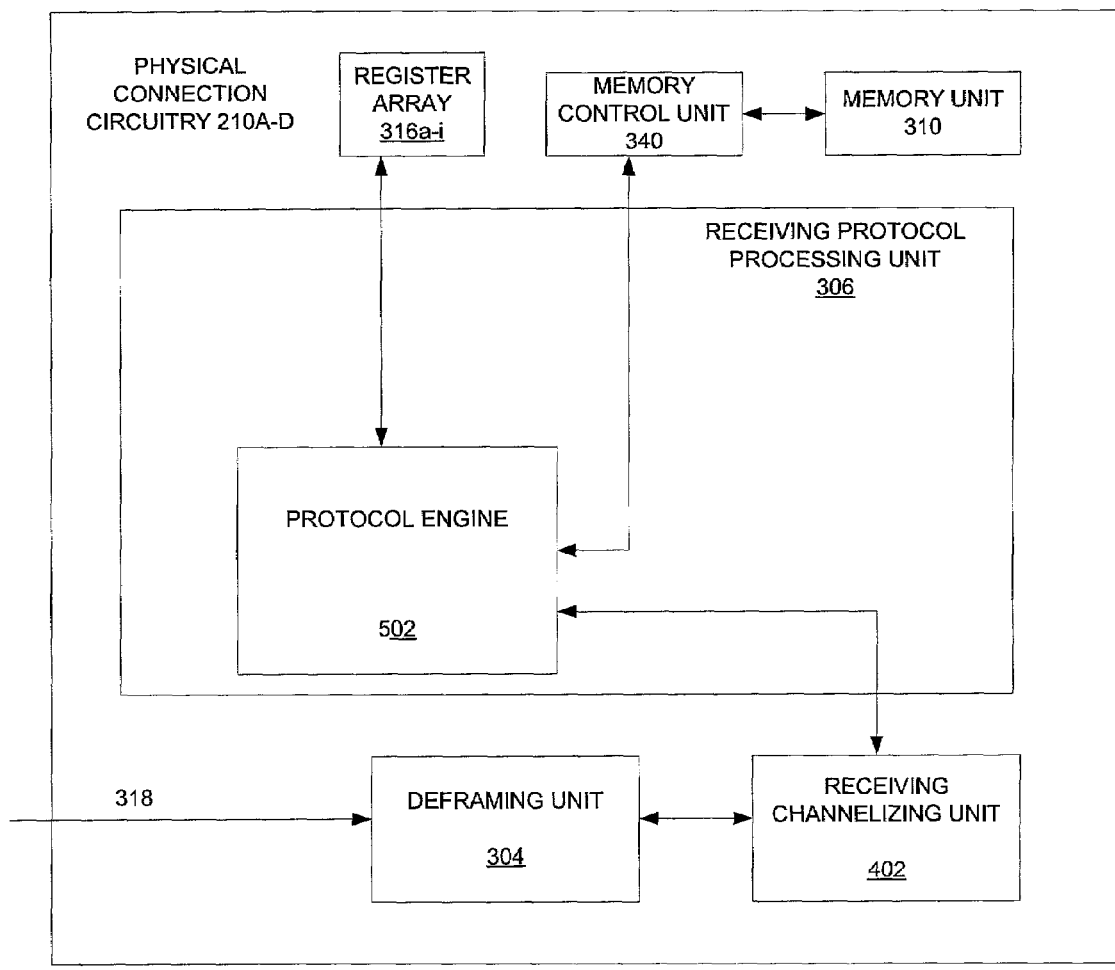
FIG. 5 illustrates a flowchart for the processing of data being received into a network element, according to embodiments of the present invention.

FIG. 5 is a block diagram of a portion of physical connection circuitry 210A-D, according to embodiments of the present invention. The operations of the portions of protocol processing unit 306 illustrated in FIG. 5 will be described in more detail in conjunction with the flow diagram illustrated in FIG. 6. In one embodiment, receiving protocol processing unit 306 includes protocol engine 502. According to embodiments of the present invention, protocol engine 502 includes hardware circuitry including digital logic. Alternatively, in addition to hardware circuitry, protocol engine 502 includes software for controlling the hardware circuitry. Protocol engine 502 is coupled to receiving channelizing unit 402 and memory control unit 340. Memory control unit 340 is coupled to memory unit 310. Receiving channelizing unit 402 is coupled to deframing unit 304, and deframing unit 304 receives signal 318.

Figure 6:
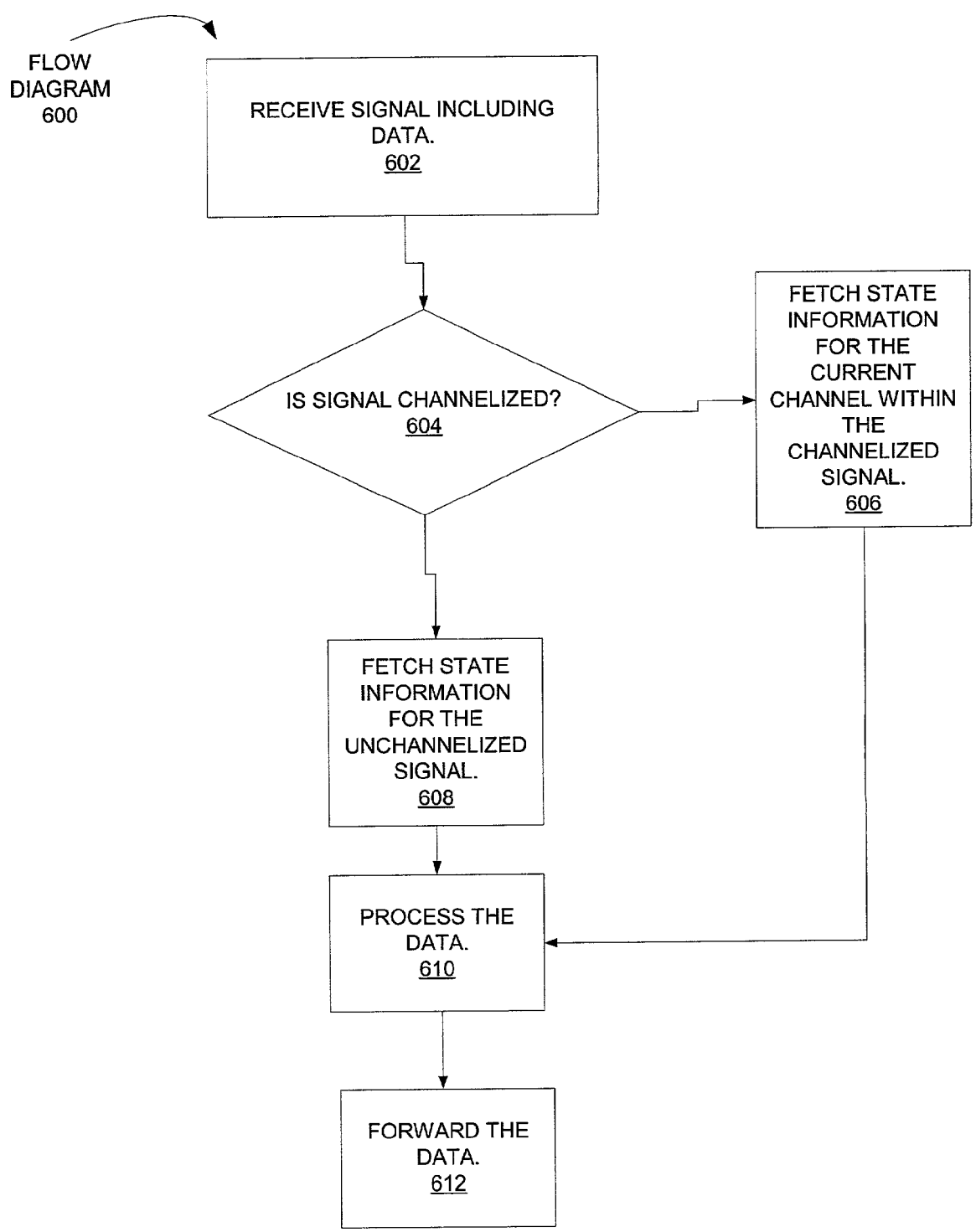
FIG. 6 is a block diagram of a portion of physical connection circuitry 210A-D, according to embodiments of the present invention.

FIG. 6 illustrates a flow diagram for the processing of data being received into a network element, according to embodiments of the present invention. In particular, FIG. 6 includes flow diagram 600 that illustrates the processing of data received by receiving protocol processing unit 306. Flow diagram 600 commences with the receipt of data in signal 318 by deframing unit 304, at process block 602. In an embodiment, the signal 318 includes portions of data packets. In an embodiment, deframing unit 304 receives signal 318 from an external network element (not shown). Returning to FIGS. 1 and 2 to help illustrate, physical connection circuitry 210 of FIG. 2 could be located within in-ring network element 102 to receive signal 318 from non-ring network element 110. Additionally, physical connection circuitry 210 of FIG. 6 could be located within in-ring network element 102 to receive signal 318 from in-ring network element 108.

Figure 7:
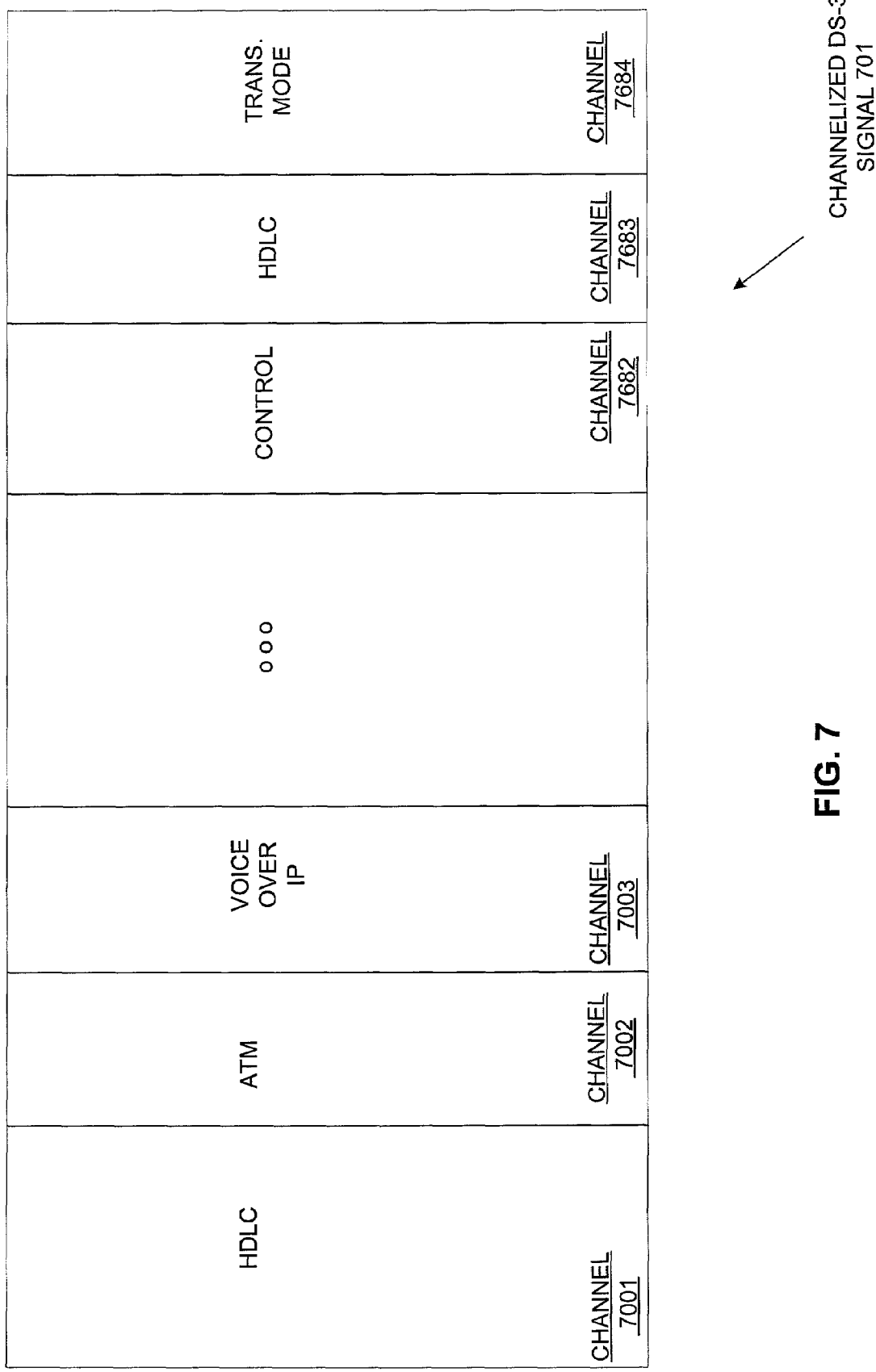
FIG. 7 illustrates a number of channelized DS-3 signals that are processed, according to embodiments of the present invention.

For the embodiment of physical connection circuitry 210 illustrated in FIG. 5, after deframing unit 304 receives signal 318, receiving channelizing unit 402 receives signal 318 for placement into buffers. In an embodiment, receiving channelizing unit 402 includes buffers 406a-i associated with different channels, wherein the channels include data packets. In an embodiment, the number of buffers is four. However, embodiments of the present invention are not so limited, as a lesser or greater number of buffers can be included within receiving channelizer unit 402. Additionally, in one embodiment, buffers 406a-i can associate a channel with a number of SONET frames, which is described in more detail below in conjunction with FIG. 8. In an embodiment, signal 318 is based on the DS-3 standard. In another embodiment, signal 318 is based on the DS-1 standard. In one embodiment, signal 318 comprises a number of DS-3 signals. In one such embodiment, the number of DS-3 signals is included in a SONET/SDH signal. Additionally, in an embodiment, signal 318 is channelized DS-3 signals. FIG. 7 illustrates one embodiment of a number of channelized DS-3 signals.

FIG. 7 illustrates a number of channelized DS-3 signals that are processed, according to embodiments of the present invention. In this embodiment, FIG. 7 illustrates 12 channelized DS-3 signals. FIG. 7 illustrates channelized DS-3 signals 701 that includes channel 7001, channel 7002, channel 7003 through channel 7682, channel 7683 and channel 7684. As illustrated, in an embodiment, channelized DS-3 signals 701 can include 784 channels. Moreover in one embodiment, each of these 784 channels can include a different protocol.

For channelized DS-3 signals 701, channel 7001 is configured to process data traffic having a High-level Data Link Control (HDLC) protocol, while channel 7002 is configured to process data traffic (i.e., data packets) having an Asynchronous Transfer Mode (ATM) protocol. Embodiments of the present invention can incorporate different types of the ATM protocol including but not limited to direct map, Physical Layer Convergence Protocol (PLCP) and ATM Adaptation Layer (AAL5). Additionally, channel 7003 is configured to process data traffic having a Voice over Internet Protocol (VoIP) protocol, while channel 7683 is configured to process data traffic having an HDLC protocol. The above-described protocols are by way of example and not by way of limitation, as other types of protocols can be incorporated into embodiments of the present invention. Moreover, channel 7684 illustrates another example of a mode, termed transparent mode, that data can be in for processing by receiving protocol processing unit 306. In particular, in an embodiment, a channel may not be associated with a protocol. Accordingly, receiving protocol processing unit 306 forwards the data as a number of bits, independent of a protocol.

Channel 7682 illustrates another type of data that can be transmitted within a channel of channelized DS-3 signals 701. In particular, channel 7682 transmits control data. In one such embodiment, this control data for a given control channel is associated with the DS-3 signal or one of the 28 DS-1s within the DS-3 channel. Accordingly in one such embodiment, one channelized DS-3 signal can include 29 channels carrying control data (i.e., control channels), which includes a control channel for the channelized DS-3 signal and a control channel for each of the 28 DS-1 signals. In an embodiment, the control channel for the channelized DS-3 is a maintenance data link (MDL) channel, and the control channels for the 28 DS-1s are facility data link (FDL) channels, as is known in the art.

In one embodiment, these different control channels being processed within physical connection circuitry 210 employ the HDLC protocol. In another embodiment, these different control channels being processed within physical connection circuitry 210 employ the transparent mode. However, embodiments of the present invention are not limited to the employment of the HDLC protocol or the transparent mode for use in these different control channels, as other types of protocols can be incorporated for the usage in these control channels.

Additionally, while channels in channelized DS-3 signals 701 can have a same protocol, such channels can have different configurations for such a protocol. For example, channel 7001 and channel 7683 both carry High-level Data Link Control (HDLC) traffic. However, the configuration for HDLC for channel 7001 can be different than the configuration for HDLC for channel 7683. For example, as is known in the art, HDLC can support different scrambling modes, such as Asynchronous Transfer Mode (ATM) type scrambling and Larscom scrambling. Accordingly, the configuration for channel 7001 could include an ATM type scrambling, while the configuration for channel 7683 could include Larscom scrambling. Embodiments of the present invention are described in terms of a DS-3 or DS-1 signal. However, this is by way of example and not by way of limitation, as other types of signals carrying multiple protocols can be incorporated into embodiments of the present invention.

Channelized DS-3 signals 701, which are being processed by embodiments of the present invention, are by way of example and not by way of limitation, as other types of signals in other types of configurations can be incorporated into embodiments of the present invention. For example, in another embodiment, if there are a number of DS-3 signals, portions of these DS-3 signals may be channelized while the others may be unchannelized. Accordingly, the number of channels to be processed can vary depending on the type and number of incoming signals as well as the configuration of such signal(s).

In one embodiment, the channels are traversed in sequential order starting with channel 7001 up through channel 7684. In another embodiment, the channels are prioritized such that certain channels are processed more frequently in comparison to other channels within the signal being received by receiving protocol processing unit 306. For example, control channels typically are not required to be serviced as frequently in comparison to channels carrying data. Accordingly, channels 7001-7003 and 7683-7684 are serviced by receiving protocol processing unit 306 more frequently in comparison to channel 7682. The above embodiments of the order of traversal are by way of example and not by way of limitation, as any other type of order of traversal may be incorporated into embodiments of the present invention.

In one embodiment of the invention, signal 318 includes a number of unchannelized DS-3 signals. Unchannelized signals are not subdivided into a number of channels. Therefore, unchannelized DS-3s do not include a number of channels or a number of DS-1s, as described above. Conceptually, an unchannelized signal may be thought of as one large pipe, while a channelized signal may be a large pipe containing a number of smaller pipes.

Figure 8:
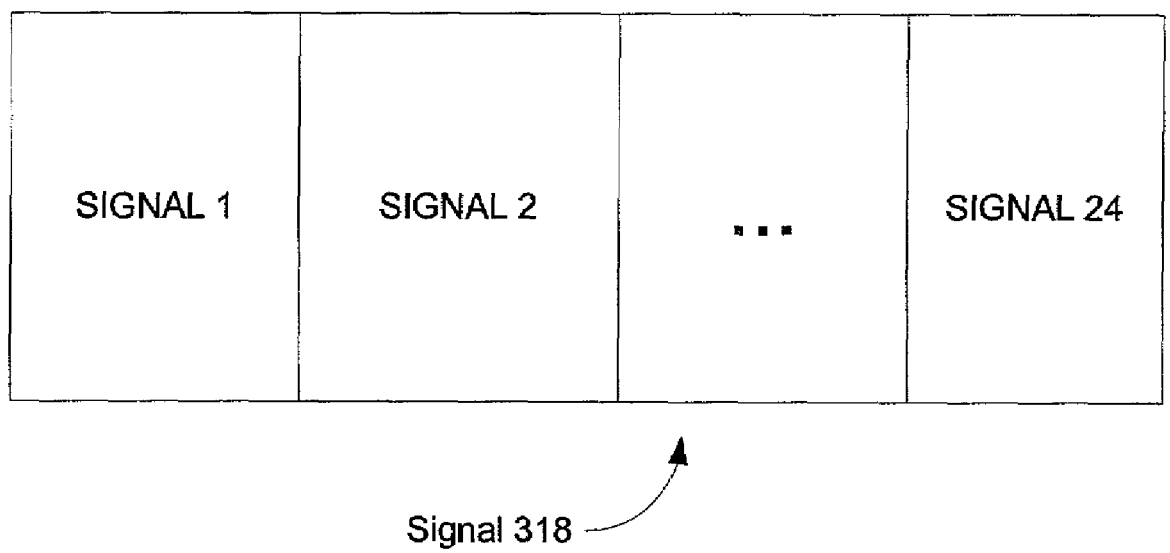
FIG. 8 illustrates a number of unchannelized DS-3 signals that are processed, according to embodiments of the present invention.

FIG. 8 illustrates a number of unchannelized DS-3 signals that are processed, according to embodiments of the present invention. In particular, FIG. 8 illustrates unchannelized signals 1 through 24. In an embodiment, 12 of the 24 signals are data channels and 12 are control channels. In an embodiment, the control channels are MDL control channels, as known in the art. As for the data channels, embodiments of the present invention can incorporate different ATM protocols including but not limited to direct map, Physical Layer Convergence Protocol (PLCP) and ATM Adaptation Layer (AAL5). Additionally, embodiments may configure some unchannelized data channels to Voice over Internet Protocol (VoIP) protocol, while configuring others to the HDLC protocol.

Figure 9:
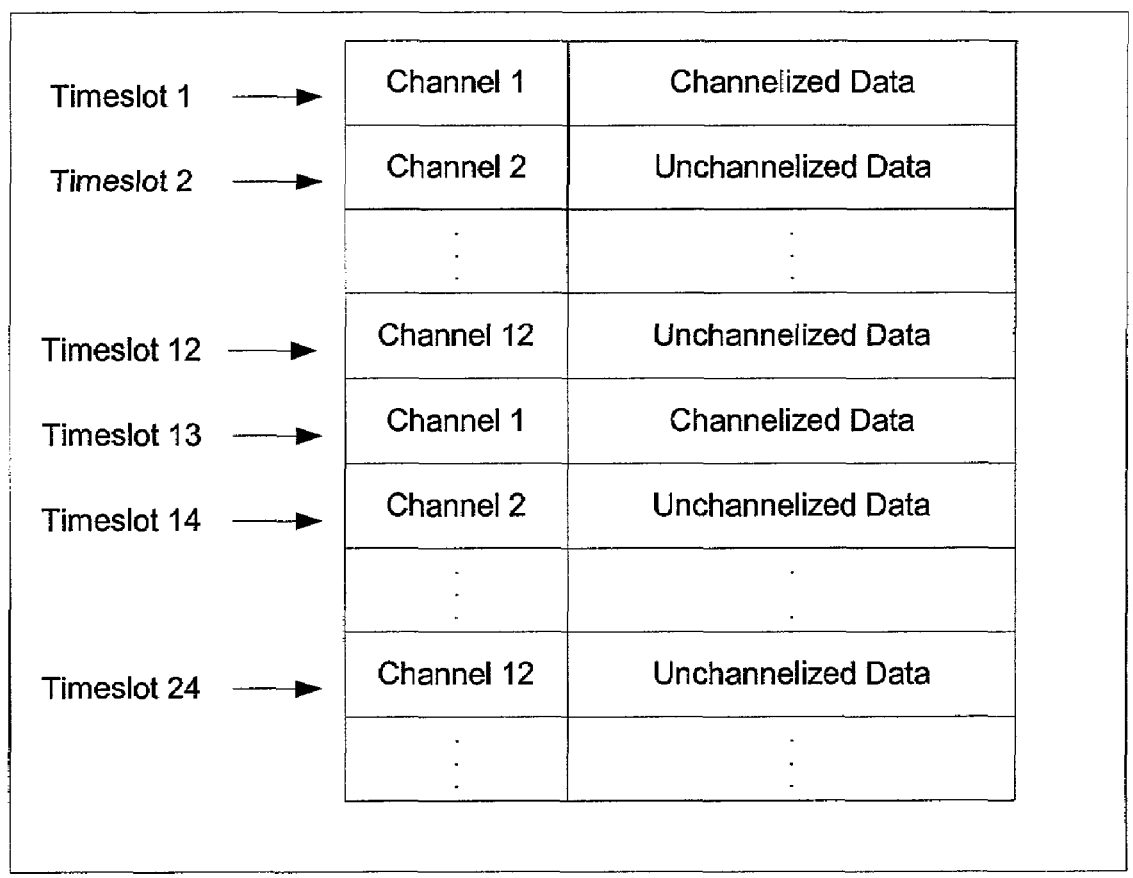
FIG. 9 illustrates a method for processing channels according to embodiments of the present invention.

Physical connection circuitry 210A-D performs channel processing using timeslots. A timeslot represents a duration for which a task is performed. FIG. 9 illustrates a method for processing channels according to embodiments of the present invention. In an embodiment shown in FIG. 9, signal 318 includes twelve channels, where six are channelized and six are unchannelized. During timeslot 1, channel 1's channelized data is processed; during timeslot 2, channel 2's unchannelized data is processed, and so on. Once channel 12 is serviced, protocol processing unit 306 proceeds with channel 1, continually repeating this process. In one embodiment, for the channels comprising channelized data, each "sub-channel" is processed sequentially. For example, assuming channel 1 includes 5 channels, during the first timeslot in which channel 1 is processed, channel 1's first channel is processed. During channel 1's next timeslot, its second channel is processed, and so on. Alternatively, the channels within a channel can be processed according to any suitable scheduling algorithm.

Returning to FIG. 6, at process block 604, it is determined whether the signal is channelized. If the signal is channelized, control continues at process block 606. Otherwise, control continues at process block 608. In an embodiment of the present invention, receiving protocol processing unit 306 inspects a channel configuration bit, associated with the channel to be processed, in register array 316a-i. If the configuration bit is set, the channel to be processed is in channelized format, and if the configuration bit is not set, the channel to be processed is in unchannelized format. Alternatively, receiving protocol processing unit 306 may determine whether the channel to be processed is channelized or unchannelized by inspecting values larger than a bit. For example, receiving protocol processing unit 306 may inspect a memory word or half-word in register array 316a-i.

In an alternative embodiment of the invention, receiving protocol processing unit 306 determines whether the signal is channelized or unchannelized based on information received from receiving channelizing unit 402. For example, receiving channelizing unit 402 sends (along with data to process) a channel and "sub-channel" number (where the channel number is associated with a channelized or unchannelized signal and the "sub-channel" number is associated with a channel within a channelized signal) to the receiving protocol processing unit 306 to indicate which channel and/or sub-channel the data is associated with. From the channel and sub-channel numbers, receiving protocol processing unit 306 can determine whether the signal is channelized or unchannelized.

At process block 606, the state information for the current channel within the channelized signal is fetched. For example, according to one embodiment of the invention, receiving protocol processing unit 306 fetches the state information of the current channelized channel from register array 316a-i. More specifically, according to one embodiment of the invention, receiving protocol processing unit 306 fetches the state information of the channel and sub-channel based on the channel and sub-channel indicators sent by the receiving channelizing unit 402. The state information includes information about the data to be processed and the protocol to be used, including any protocol options that are enabled. For example, protocol engine 502 may support any number of protocols including HDLC, ATM, IP, and other protocols known in the art. Protocol options define various protocol specific operations that are carried out by protocol engine 502. For example, for the HDLC protocol, protocol options could include whether to enable scrambling as well as the type of scrambling that is enabled (e.g., ATM type scrambling, Larscom scrambling, digital link, Kentrox, etc.). Additionally, in an embodiment, protocol options include storing previous data received from the channel to be processed. In an embodiment, receiving protocol processing unit 306 receives and processes one byte for a given channel. Accordingly, protocol engine 502 stores a number of previously received bytes for this channel in register array 316a-i. The number of bytes stored for a given channel is dependent on the protocol associated with the channel.

To help illustrate, for the HDLC protocol, receiving protocol processing unit 306 can perform bit "destuffing" upon receipt of a given bit combination, as is known in the art. In one embodiment, a bit combination of '0111110' indicates that bit "destuffing" for the HDLC protocol is required. However, this bit combination may be across two different bytes received by receiving protocol processing unit 306. Accordingly, in an embodiment for the HDLC protocol, receiving protocol processing unit 306 stores a previous byte as part of the previous state for the channel. For example, a previous byte stored in the previous state could include the bit combination of '00101001' while the current byte being received could include the bit combination of '11110101'. The last two bits of the previous byte in conjunction with the first six bits of the current byte include the bit combination '0111110', thereby indicating that bit "destuffing" for the HDLC protocol is required.

However, embodiments of the present invention are not limited to the storage of a single previous byte associated with a channel in register array 316a-i, as different protocols may be more demanding in the number of bytes needed to determine relevant information for the given protocol. For example, for the ATM protocol the previous four bytes are stored in the previous state in order to generate the Header Error Check (HEC) for the ATM cells, as is known in the art. In an embodiment, the size of register arrays 316a-i are large enough to accommodate the most demanding protocol.

At process block 608, the state information for the current unchannelized signal is fetched. For example, receiving protocol processing unit 306 fetches the state information from register array 316a-i. According to one embodiment of the invention, receiving protocol processing unit 306 fetches the state information of the unchannelized channel based on the channel indicators sent by the receiving channelizing unit 402. The state information for unchannelized signals is similar to the state information for channelized signals described above.

At process block 610, the data is processed. For example, receiving channelizing unit 402 sends the data stored in its buffer(s) to receiving protocol processing unit 306 for processing. Upon receipt of the data in receiving protocol processing unit 306, protocol engine 502 processes the data according to the state information associated with the current channelized/unchannelized signal. Protocol engine 502 processes the data for signals that are channelized and unchannelized. As noted above, the state information can include protocol settings that determine how protocol engine 502 processes the data. According to embodiments of the invention, protocol engine 502 processes data as described above, with reference to state information.

At process block 612, receiving protocol processing unit 306 forwards the data through the network element. For example, referring to FIG. 4, receiving protocol processing unit 306 forwards the data as part of a packet, such as an ATM cell, to memory unit 310 through memory control unit 340. Accordingly, ingress packet processing circuitry 216 retrieves these processed packets from memory unit 310 through memory control unit 340. The above description of the processing of data within signal 318 is by way of example and not by way of limitation, as different protocols require different configurations and calculations, thereby requiring the storage of different types and sizes of the previous states for the different channels.

Processing of Data Packets Transmitted

Figure 10:
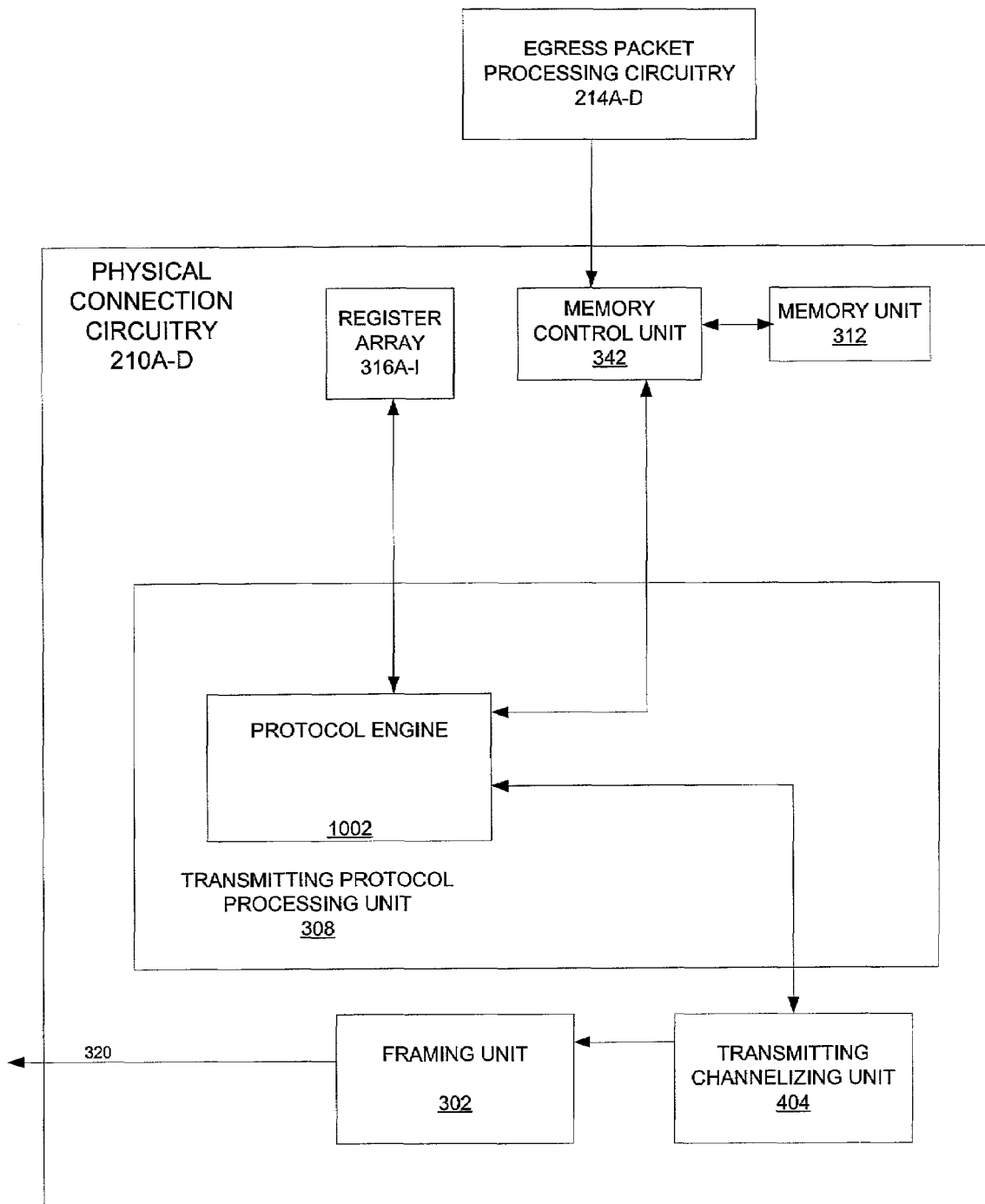
FIG. 10 is a block diagram of a portion of physical connection circuitry 210A-D, according to embodiments of the present invention.

FIG. 10 is a block diagram of a portion of physical connection circuitry 210A-D, according to embodiments of the present invention. The operations of the portions of protocol processing unit 308 illustrated in FIG. 10 will be described in more detail in conjunction with the flow diagram illustrated in FIG. 12. In one embodiment, transmitting protocol processing unit 308 includes protocol engine 1002. According to embodiments of the present invention, protocol engine 1002 includes hardware circuitry including digital logic. Alternatively, in addition to hardware circuitry, protocol engine 1002 includes software for controlling the hardware circuitry. Protocol engine 1002 is coupled to register array 314*a-i*, memory control unit 342, and transmitting channelizing unit 404. Memory control unit 342 is coupled to egress packet processing circuitry 214A-D (not shown). Transmitting channelizing unit 404 is coupled to framing unit 302, and framing unit 302 generates signal 320.

Figure 11:
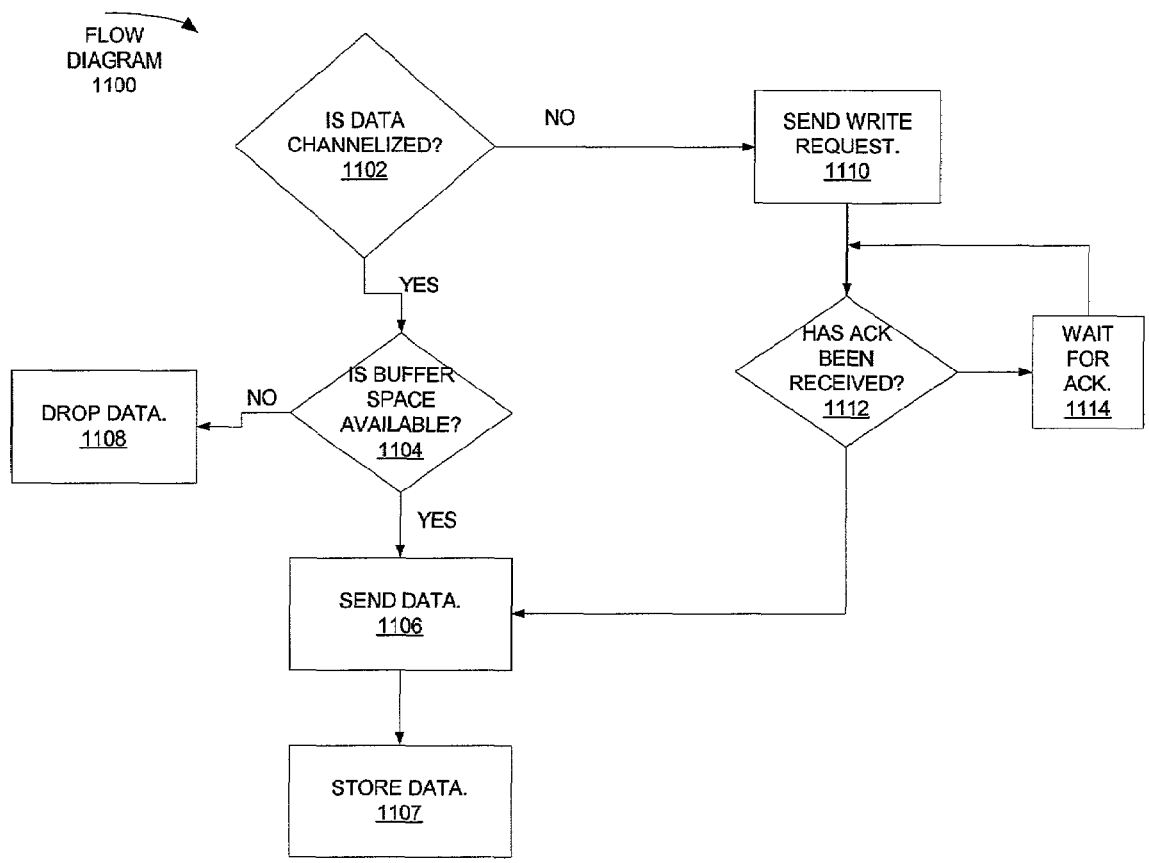
FIG. 11 is a flow diagram illustrating the receipt of data, according to embodiments of the invention.

FIG. 11 is a flow diagram illustrating the receipt of data, according to embodiments of the invention. FIG. 11 will be described with reference to the exemplary embodiment of FIG. 10. At process block 1102, it is determined whether the data is in a channelized or unchannelized format. If the data is within a channelized signal, control continues at block 1104. Otherwise, control continues at block 1110. For example, according to the exemplary embodiment of FIG. 10, transmitting protocol processing unit 308 determines whether egress packet processing circuitry 214A-D (not shown) is attempting to send data in a channelized or unchannelized signal.

At decision block 1104, it is determined whether space is available in the appropriate buffer. If there is space available, control continues at block 1106. Otherwise control continues at block 1108. According to embodiments of the invention, there is a buffer in memory unit 312 for each channel supported by transmitting protocol processing unit 308. More specifically, there are buffers for both channelized and unchannelized data. In one embodiment of the invention, for unchannelized data, there are thirty-two buffers, each being thirty-two bytes long. For channelized data, there are 896 buffers, each being thirty-two bytes long. These buffers are not limited to a thirty-two byte length, but can be any suitable length (e.g., 8 or 64 bytes in length).

Each of the buffers for channelized data has a read and write pointer associated with it to indicate where in the buffer data was last read and written from. Egress packet processing circuitry 214A-D tracks the position of the read and write pointers for each channel, so it can determine the available space for each buffer. For example, the available space can be calculated by subtracting the space between the read and write pointers from the entire buffer space. As a more specific example, if the buffer holds ten data bytes and the space between the read and write pointers is eight bytes, there are two bytes of storage space available.

At process block 1106, the data is sent. For example, upon determining there is available space, egress packet processing circuitry 214A-D sends the data to transmitting protocol processing unit 308. Control continues at block 1109.

At block 1107, the data is stored. For example, transmitting protocol processing unit 308 stores the data in a buffer in memory unit 310.

At block 1108, the data is dropped. For example, if there is no space in the appropriate buffer, the data is dropped (i.e. the data is not sent to the transmitting protocol processing unit 308; it is discarded).

At block 1110, a write request is sent. For example, egress packet processing circuitry 214A-D sends a write request to transmitting protocol processing unit 308 indicating that it has (unchannelized) data to send. Control continues at block 1112.

At block 1112, it is determined whether an acknowledgement was received. If an acknowledgement was received control continues at block 1106. Otherwise, control continues at block 1114. For example, if buffer space is available in the appropriate unchannelized data buffer (the concept of buffers is described above with reference to block 1104), transmitting protocol processing unit 308 sends an acknowledgement to egress packet processing circuitry 214A-D. If buffer space is not available, transmitting protocol processing unit 308 does not send an acknowledgement to egress packet processing circuitry 214A-D.

At block 1114, the arrival of an acknowledgement is awaited. For example, egress packet processing circuitry 214A-D does not send data to transmitting protocol processing unit 308 until an acknowledgement is received. Control continues at block 1112.

Figure 12:
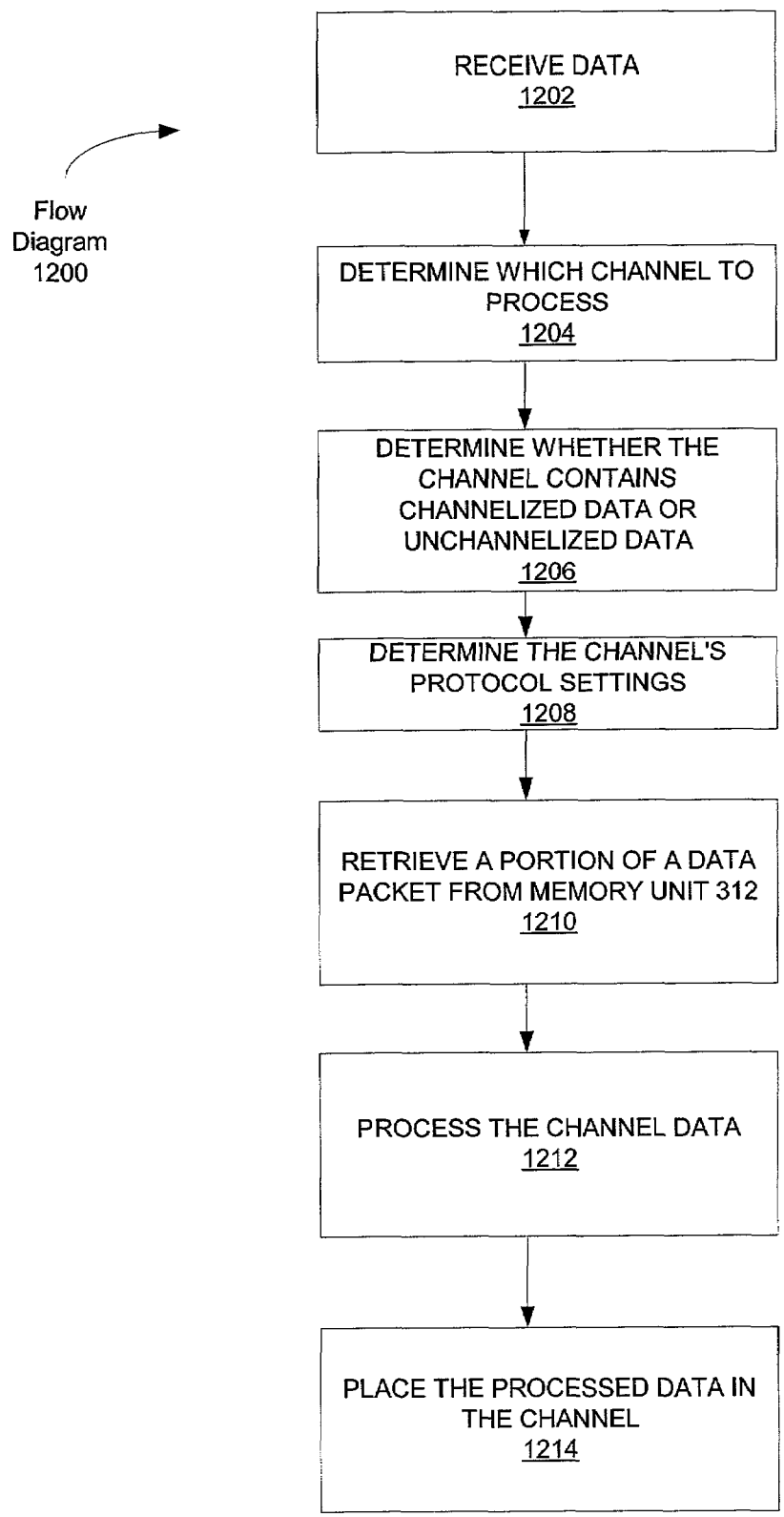
FIG. 12 illustrates a flow diagram for the processing of data being transmitted out from a network element, according to embodiments of the present invention.

FIG. 12 illustrates a flow diagram for the processing of data being transmitted out from a network element, according to embodiments of the present invention. In particular, FIG. 12 includes flow diagram 1200 that illustrates the processing of data packets received by transmitting protocol processing unit 308 that are stored in memory unit 312. In an embodiment, such data packets that are stored in memory unit 312 are being received from egress packet processing circuitry 214A-D.

At process block 1202, data is received, as described above with reference to FIG. 11 above.

At process block 1204, a determination is made about which channel is to be processed. According to embodiments of the invention, transmitting protocol processing unit 308 determines which channel to process based on a table stored in memory within physical connection circuitry 210 (not shown), a prioritization scheme, or other suitable method. Such a table sets the order of traversal of the different channels of signal 320. According to alternative embodiments of the invention, framing unit 302 determines which channel to process based on a table stored in memory within physical connection circuitry 210 (not shown), a prioritization scheme, or other suitable method. Once framing unit 302 makes this determination, it sends a signal to transmitting protocol processing unit 308 indicating which channel to process. Returning to FIG. 7 to help illustrate, in one embodiment, the channels are traversed in sequential order starting with channel 7001 up through channel 7684. In another embodiment, the channels are prioritized such that certain channels are processed more frequently in comparison to other channels within signal 320. For example, control channels typically are not required to be serviced as frequently in comparison to channels carrying data. Accordingly, channels 7001-7003 and 7683-7684 are serviced by transmitting protocol processing unit 308 more frequently in comparison to channel 7682. The above embodiments of the order of traversal are by way of example and not by way of limitation, as any other type of order of traversal may be incorporated into embodiments of the present invention.

At process block 1206, protocol engine 1002 determines whether the channel contains channelized data or unchannelized data. As similarly described above, in an embodiment of the present invention, protocol engine 1002 inspects a channel configuration bit, associated with the channel to be processed, in state memory 1004. If the configuration bit is set, the channel to be processed is in channelized format, and if the configuration bit is not set, the signal to be processed is in unchannelized format. Alternative embodiments use other data structures to indicate whether the signal is channelized or unchannelized (e.g. they may use bytes or some other number of bits).

At process block 1208, protocol engine 1002 determines the protocol settings of the channel to be processed. Protocol engine 1002 retrieves the protocol settings associated with the channel to be processed from state memory 1004. The protocol settings include information about the channel protocol to be used and any protocol options that are enabled. For example, protocol engine 1002 may support any number of protocols including HDLC, ATM, IP, and other protocols known in the art. Protocol options define various protocol specific operations that are carried out by protocol engine 1002.

At process block 1210, transmitting protocol processing unit 308 retrieves at least a portion of a data packet that is to be transmitted on the selected channel. In one embodiment, for given protocols, protocol engine 1002 delays the retrieval of portions of a data packet until a threshold amount of the entire data packet has been stored in memory unit 312. For example, for data packets having an ATM protocol, protocol engine 1002 delays the retrieval of a portion of data for a given ATM cell until a threshold portion of the payload has been stored in memory unit 312 by egress packet processing circuitry 214A-D. Moreover, in an embodiment, if a given channel is based on the ATM protocol and the amount of data for the next ATM cell to be transmitted has not exceeded the threshold for this channel, protocol engine 1002 forwards an idle ATM cell to framing unit 302.

In one embodiment of the invention, protocol engine 1002 checks this threshold amount for the entire data packet for the first portion of the data packet being processed by transmitting protocol processing unit 308. However, embodiments of the present invention are not so limited, as certain data packets may contain multiple data cells, depending on the protocol and protocol configuration. For example, in an embodiment, a channel transmitting an ATM protocol may be transmitting a data packet that can contain more than a single ATM cell therein. In one such embodiment, transmitting protocol processing unit 308 checks if the threshold value for an ATM cell within a given data packet and not just the entire data packet for a given ATM cell has been reached prior to the transmission of the ATM cell to framing unit 302.

In one embodiment, each of the different protocols as well as each of the different channels of a same protocol can configure this threshold value. Embodiments of the present invention are not limited to the transmission of an idle cell if the data is not complete, as described in conjunction with the ATM protocol above. For example, in an embodiment of the voice over IP protocol, transmitting protocol processing unit 308 can retransmit the previous packet for the given channel. Additionally, in an embodiment, if a threshold value for a given protocol and protocol configuration has not been achieved but the completed packet has been stored in memory unit 312, transmitting protocol processing unit 308 proceeds with the processing of this packet to send to framing unit 302. Accordingly, this checking of threshold values by transmitting protocol processing unit 308 precludes underrunning, which is condition wherein transmitting protocol processing unit 308 does not have enough of a data packet to complete the transmission of the entire data packet to framing unit 302.

At process block 1212, transmitting protocol processing unit 308 processes the data in the selected channel. Transmitting protocol processing unit 308 processes data in the selected channel based on whether the channel is channelized or unchannelized, the channel's protocol, and the data retrieved from memory unit 312. In one embodiment, the processing of the data for this given channel includes encapsulating the data into a particular protocol, such as ATM, HDLC, or Voice over IP. Moreover, in an embodiment, the channel protocol settings include whether the channel is enabled, the type of protocol as well as the enabled protocol options associated with the selected channel. For example, for the HDLC protocol, configurations could include whether to enable scrambling as well as the type of scrambling enabled (e.g., ATM type scrambling, Larscom scrambling, digital link, Kentrox, etc.).

At process block 1214, transmitting protocol processing unit 308 places the processed data in the selected channel. Transmitting protocol processing unit 308 sends the processed data to a location within transmitting channelizing unit 404 that is associated with the selected channel. Transmitting channelizing unit 404 forwards the data to framing unit 302, which inserts the data into the selected channel of signal 320.

Embodiments of the present invention are not limited to the channelized DS-3 signals, as illustrated in FIG. 6. In particular, embodiments of the present invention can be incorporated into channelized DS-1 signals, unchannelized DS-3 signals, unchannelized DS-1 signals as well as both channelized and unchannelized T1 and T3 signals. Further, in one embodiment, physical connection circuitry 210 is incorporated into a single Application Specific Integrated Circuit (ASIC).

Moreover, embodiments of the present invention were described in terms of the processing of a DS-3 and/or DS-1 signals. However, embodiments of the present invention are not so limited, as other type of signals can be processed according to embodiments of the present invention. For example, signals based on the SONET/SDH standard can be incorporated into embodiments of the present invention. In particular, signals based on the SONET/SDH standard can concatenate Synchronous Transport Signal (STS)-1 frames such that different STS-1 frames and/or the different concatenation of STS-1 frames can be processed by physical connection circuitry 210 differently as described above.

To help illustrate, FIG. 13 is a block diagram of a SONET signal carrying data, according to embodiments of the present invention. In particular, FIG. 13 illustrates a STS-48 SONET signal, which could be transmitted among in-ring network elements 102-108 of FIG. 1. As shown, the 48 frames of this STS-48 signal are apportioned into different groups. In particular, data traffic within this STS-48 signal is located in STS1-9, STS10-11, STS12-21, STS22-23, STS24-35, STS36-37, STS38-44, STS45-46 and STS47-48 within SONET portions 1302, 1304, 1306, 1308, 1310, 1312, 1314, 1316 and 1318, respectively. Accordingly, each of the groups of STS frames are concatenated together. For example, STS frames 24-35 are concatenated together. In an embodiment, the concatenation of STS frames within the SONET/SDH signals can be of any size and across any location within the SONET/SDH signals, which is described in more detail in a patent application titled "Any Size and Location of Concatenated Packet Data across TDM frames in a TDM signal" to Anurag Nigam and David Stiles, filed on Dec. 30, 2000, Ser. No. 09/751,764, which is hereby incorporated by reference.

Therefore, each of the individual frames of the SONET/SDH signals and/or concatenation of frames of the SONET/SDH signal can be processed by physical connection circuitry 210 such that each frame and/or concatenation includes a different protocol and/or protocol configuration, as described above in conjunction with the DS-1/DS-3 signals. For example, SONET portion 1302 could be configured to process an ATM protocol having a first set of configurations, while SONET portion 1304 could be configured to process a Frame Relay protocol having a first set of configurations. Additionally, SONET portion 1306 could be configured to process a voice over IP protocol having a first set of configurations, while SONET portion 1308 could be configured to process a PPP protocol having a first set of configurations. Moreover, SONET portion 1310 could be configured to process an IP protocol having a first set of configurations, while SONET portion 1312 could be configured to process a Frame Relay protocol having a second set of configurations. SONET portion 1314 could be configured to process an IP protocol having a second set of configurations, while SONET 1316 could be configured to process an ATM protocol having a second set of configurations. Moreover, SONET portion 1318 could be configured to process a Frame Relay protocol having a third set of configurations.

The delineation and configuration of the SONET signal illustrated in FIG. 13 is by way of example and not by way of limitation, as other SONET signals wherein the STS frames are delineated differently and/or the types of protocols and/or configurations incorporated into such delineations are different. Moreover, embodiments of the present invention are not limited to a DS-1, DS-3, T1, T3 or SONET-based signals. In particular, any type of data transmission signal that can be broken down into different portions such that these portions can be processed differently depending on the different protocols and/or protocol configurations.

The line cards and control cards included in the different network elements include memories, processors and/or Application Specific Integrated Circuits (ASICs), Such memory includes a computer-readable medium on which is stored a set of instructions (i.e., software) embodying any one, or all, of the methodologies described herein. Software can reside, completely or at least partially, within this memory and/or within the processor and/or ASICs. For the purposes of this specification, the term "computer-readable medium" shall be taken to include any mechanism that stores information in a form readable by a computer). For example, a computer-readable medium includes read only memory (ROM); random access memory (RAM); magnetic disk storage media; optical storage media; flash memory devices.

Thus, a method and apparatus for processing channelized and unchannelized data within a signal have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving in a single line card within a network element, data packets within a plurality of channels, wherein each of the plurality of channels are channelized or unchannelized;
   processing, in a protocol engine in the single line card within the network element, the data packets within the plurality of channels that are channelized; and
   processing, in the protocol engine in the single line card within the network element, the data packets within the plurality of channels that are unchannelized.

2. The method of claim 1, wherein the unchannelized channels are DS-3 signals.

3. The method of claim 2, wherein the channelized signals are DS-3 signals comprising a number of DS-1 channels.

4. The method of claim 3 wherein the processing, in the protocol engine within the network element, the data packets within the plurality of channels comprises determining protocol settings.

5. The method of claim 4 wherein the data packets are formatted according to a number of protocols.

6. The method of claim 5 wherein the number of protocols comprises ATM, IP, Frame Relay, voice over IP, PPP, Multi-Protocol Label Switching (MPLS), and Ethernet.

7. A method comprising:
   receiving in a network element data packets associated with a plurality of channels, wherein each of the plurality of channels are either channelized or unchannelized, and wherein the data packets are stored in a buffer within the network element; and
   sending the data packets to a protocol engine in a single line card for processing, wherein the processing comprises for each data packet:
      determining a channel of the plurality of channels to process;
      determining whether the channel is channelized or unchannelized;
      determining protocol settings for the channel, upon determining the channel is unchannelized;
      determining protocol settings for the channel, upon determining the channel is channelized;
      processing the data packets; and
      transmitting the data packets.

8. The method of claim 7 wherein the determining the protocol settings for the channel is based on state information.

9. The method of claim 7 wherein the unchannelized channels arc DS-3 channels.

10. The method of claim 9 wherein the channelized channels arc DS-3 signals comprising a number of DS-I channels.

11. The method of claim 7 wherein the determining whether the channel is channelized or unchannelized is based on a configuration structure within a state memory.

12. The method of claim 7 wherein the protocol settings comprises ATM, IP, Frame Relay, voice over IP, PPP, MPLS, and Ethernet.

13. A method comprising:
   receiving in a network element, data packets from a data buffer;
   processing, in a protocol engine within a single line card in the network element, the data packets;
   determining whether the processed data packets are to be inserted into channelized or unchannelized channels;

upon determining that certain of the data packets are to be inserted into channelized channels, inserting the data packets into a channelized channel of a number of channels; and upon determining that certain of the data packets are to be inserted into unchannelized channels, inserting the data packets into an unchannelized channel of the number of channels.

14. The method of claim 13, wherein the data packets are formatted according to a number of protocols.

15. The method of claim 14, wherein the number of protocols comprises ATM, IP, Frame Relay, voice over IP, PPP, MPLS, and Ethernet.

16. The method of claim 15, wherein the processing, in a protocol engine within the network element, comprises encapsulating the data into one of the number of protocols.

17. The method of claim 16 wherein the number of unchannelized channels are DS-3s, and wherein the number of channelized channels are DS-3s comprising a number of DS-1s.

18. An apparatus comprising:
a first memory unit to store incoming data received from an external signal, wherein the incoming data is in channelized and unchannelized formats, and wherein the formats are based on a number of protocols;
a first protocol engine coupled to the first memory unit, the protocol engine to process the incoming data;
a second memory unit to store outgoing data received from an internal signal, wherein the data is in channelized and unchannelized formats, and wherein the formats are based on a number of protocols; and
a second protocol engine coupled to the second memory unit, the protocol engine to process the outgoing data.

19. The apparatus of claim 18 further comprising:
a deframing unit coupled to said first memory unit to receive said incoming data;
a third memory unit coupled to said first protocol engine to store processed
incoming data;
a fourth memory unit coupled to said second protocol engine to store processed outgoing data;
a framing unit coupled to said fourth memory to transmit said outgoing data.

20. The apparatus of claim 19 wherein said third and fourth memories are to store state information used to process said incoming data and said outgoing data.

21. The apparatus of claim 20 wherein the number of protocols formats include ATM, IP, Frame Relay, voice over IP, PPP, MPLS, and Ethernet.

22. A computer-readable medium that provides instructions, which when executed by a processor, cause said processor to perform operations comprising:
receiving in a single line card within a network element, data packets within a plurality of channels, wherein each of the plurality of channels are channelized or unchannelized;
processing, in a protocol engine in the single line card within the network element, the data packets within the plurality of channels that are channelized; and
processing, in the protocol engine in the single line card within the network element, the data packets within the plurality of channels that are unchannelized.

23. The computer-readable medium of claim 22, wherein the unchannelized channels are DS-3 signals.

24. The computer-readable medium of claim 23, wherein the channelized signals are DS-3 signals comprising a number of DS-I channels.

25. The computer-readable medium of claim 24 wherein the processing, in the protocol engine within the network element, the data packets within the plurality of channels comprises determining protocol settings.

26. The computer-readable medium of claim 25 wherein the data packets are formatted according to a number of protocols.

27. The computer-readable medium of claim 26 wherein the number of protocols comprises ATM, IP, Frame Relay, voice over IP, PPP, Multi-Protocol Label Switching (MPLS), and Ethernet.

28. A computer-readable medium that provides instructions, which when executed by a processor, cause said processor to perform operations comprising:
receiving in a network element data packets associated with a plurality of channels, wherein each of the plurality of channels are either channelized or unchannelized, and wherein the data packets are stored in a buffer within the network element; and
sending the data packets to a protocol engine in a single line card for processing, wherein the processing comprises for each data packet:
determining a channel of the plurality of channels to process;
determining whether the channel is channelized or unchannelized;
determining protocol settings for the channel, upon determining the channel is unchannelized;
determining protocol settings for the channel, upon determining the channel is channelized;
processing the data packets; and
transmitting the data packets.

29. The computer-readable medium of claim 28 wherein the unchannelized channels are DS-3 channels.

30. The computer-readable medium of claim 29 wherein the channelized channels are DS-3 signals comprising a number of DS-1 channels.

31. The computer-readable medium of claim 30 wherein the determining whether the channel is channelized or unchannelized is based on a configuration structure within a state memory.

32. The computer-readable medium of claim 31 wherein the protocol settings comprises ATM, IP, Frame Relay, voice over IP, PPP, MPLS, and Ethernet.

33. A computer-readable medium that provides instructions, which when executed by a processor, cause said processor to perform operations comprising:
receiving in a network element, data packets from a data buffer;
processing, in a protocol engine within a single line card in the network element, the data packets;
determining whether the processed data packets are to be inserted into channelized or unchannelized channels;
upon determining that certain of the data packets are to be inserted into channelized channels, inserting the data packets into a channelized channel of a number of channels; and
upon determining that certain of the data packets are to be inserted into unchannelized channels, inserting the data packets into an unchannelized channel of the number of channels.

34. The computer-readable medium of claim 33, wherein the data packets are formatted according to a number of protocols.

35. The computer-readable medium of claim 34, wherein the number of protocols comprises ATM, IP, Frame Relay, voice over IP, PPP, MPLS, and Ethernet.

36. The computer-readable medium of claim 35, wherein the processing, in a protocol engine within the network element, comprises encapsulating the data into one of the number of protocols.

37. The computer-readable medium of claim 36 wherein the unchannelized channels are DS-3s, and wherein the channelized channels are DS-3s comprising a number of DS-1s.

38. A network element comprising:
- a plurality of line cards, each of the plurality of line cards to receive packets, each of the plurality of line cards including,
  - a first memory unit to store incoming data received from an external signal, wherein the incoming data is in channelized and unchannelized formats, and wherein the formats are based on a number of protocols;
  - a first protocol engine coupled to the first memory unit, the protocol engine to process the incoming data;
  - a second memory unit to store outgoing data received from an internal signal, wherein the outgoing data is in channelized and unchannelized formats, and wherein the formats are based on a number of protocols; and
  - a second protocol engine coupled to the second memory unit, the protocol engine to process the outgoing data.

39. The network element of claim 38 further comprising:
- a deframing unit coupled to said first memory unit to receive said incoming data;
- a third memory unit coupled to said first protocol engine to store processed incoming data;
- a fourth memory unit coupled to said second protocol engine to store processed outgoing data;
- a framing unit coupled to said fourth memory to transmit said outgoing data.

40. The apparatus of claim 39 wherein said third and fourth memories are to store state information used to process said incoming data and said outgoing data.

41. The apparatus of claim 38 wherein the number of protocols formats include ATM, IP, Frame Relay, voice over IP, PPP, MPLS, and Ethernet.

* * * * *